(12) United States Patent
Schreter et al.

(10) Patent No.: US 9,798,759 B2
(45) Date of Patent: Oct. 24, 2017

(54) DELEGATION OF DATABASE POST-COMMIT PROCESSING

(71) Applicant: SAP SE, Walldorf, DE (US)

(72) Inventors: Ivan Schreter, Malsch (DE); Juchang Lee, Seoul (KR); Mihnea Andrei, Issy les Moulineaux (FR); Thorsten Glebe, Leimen (DE); Changgyoo Park, Seoul (KR); Eunsang Kim, Seoul (KR)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 14/553,535

(22) Filed: Nov. 25, 2014

(65) Prior Publication Data

US 2016/0147862 A1    May 26, 2016

(51) Int. Cl.
*G06F 17/30* (2006.01)
*G06F 15/16* (2006.01)

(52) U.S. Cl.
CPC .............................. *G06F 17/30348* (2013.01)

(58) Field of Classification Search
None
See application file for complete search history.

(56) References Cited

U.S. PATENT DOCUMENTS

| | | |
|---|---|---|
| 5,701,480 A | 12/1997 | Raz |
| 5,717,919 A | 2/1998 | Kodavalla et al. |
| 5,758,145 A | 5/1998 | Bhargava et al. |
| 5,794,229 A | 8/1998 | French et al. |
| 5,870,758 A | 2/1999 | Bamford et al. |
| 6,275,830 B1 | 8/2001 | Muthukkaruppan et al. |
| 6,282,605 B1 | 8/2001 | Moore |
| 6,490,670 B1 | 12/2002 | Collins et al. |
| 6,754,653 B2 | 6/2004 | Bonner et al. |
| 6,865,577 B1 | 3/2005 | Sereda |
| 7,698,712 B2 | 4/2010 | Schreter |
| 8,024,296 B1 | 9/2011 | Gopinathan et al. |
| 8,161,024 B2 | 4/2012 | Renkes et al. |
| 8,364,648 B1 | 1/2013 | Sim-Tang |

(Continued)

FOREIGN PATENT DOCUMENTS

| | | |
|---|---|---|
| EP | 2778961 A1 | 9/2014 |
| WO | WO-0129690 A2 | 4/2001 |

OTHER PUBLICATIONS

"HANA database lectures—Outline Part 1 Motivation—Why main memory processing." Mar. 2014 (Mar. 2014). XP055197666. Web. Jun. 23, 2015.; URL:http://cse.yeditepe.edu.tr/-odemir/spring2014/cse415/HanaDatabase.pdf.

(Continued)

*Primary Examiner* — Alex Gofman
(74) *Attorney, Agent, or Firm* — Mintz Levin Cohn Ferris Glovsky and Popeo, P.C.

(57) ABSTRACT

A plurality of transactions are handled in a database. Each transaction comprises a plurality of operations on at least one record in the database with at least two of the transactions being handled concurrently. Thereafter, a temporary timestamp is assigned to each record that is based, at least in part, on the corresponding transaction. A first transaction among the plurality of transactions is subsequently committed. Afterwards, re-stamping of at least one commit timestamp modified by the first transaction is delegated. Related apparatus, systems, techniques and articles are also described.

18 Claims, 12 Drawing Sheets

(56) References Cited

U.S. PATENT DOCUMENTS

| | | | |
|---|---|---|---|
| 8,510,344 B1* | 8/2013 | Briggs | G06F 17/30353 707/802 |
| 8,650,583 B2 | 2/2014 | Schreter | |
| 8,732,139 B2 | 5/2014 | Schreter | |
| 8,768,891 B2 | 7/2014 | Schreter | |
| 9,098,522 B2 | 8/2015 | Lee et al. | |
| 9,141,435 B2 | 9/2015 | Wein | |
| 9,262,330 B2 | 2/2016 | Muthukumarasamy | |
| 9,268,810 B2 | 2/2016 | Andrei et al. | |
| 9,275,097 B2 | 3/2016 | DeLaFranier et al. | |
| 9,372,743 B1* | 6/2016 | Sethi | G06F 11/0751 |
| 2001/0051944 A1 | 12/2001 | Lim et al. | |
| 2002/0107837 A1 | 8/2002 | Osborne et al. | |
| 2002/0156798 A1 | 10/2002 | Larue et al. | |
| 2003/0028551 A1 | 2/2003 | Sutherland | |
| 2003/0065652 A1 | 4/2003 | Spacey | |
| 2003/0204534 A1 | 10/2003 | Hopeman et al. | |
| 2004/0034616 A1 | 2/2004 | Witkowski et al. | |
| 2004/0054644 A1 | 3/2004 | Ganesh et al. | |
| 2005/0097266 A1 | 5/2005 | Factor et al. | |
| 2005/0234868 A1 | 10/2005 | Terek et al. | |
| 2008/0046444 A1* | 2/2008 | Fachan | G06F 17/30194 |
| 2008/0247729 A1 | 10/2008 | Park | |
| 2009/0064160 A1 | 3/2009 | Larson et al. | |
| 2009/0094236 A1 | 4/2009 | Renkes et al. | |
| 2009/0254532 A1 | 10/2009 | Yang et al. | |
| 2009/0287737 A1 | 11/2009 | Hammerly | |
| 2010/0082545 A1 | 4/2010 | Bhattacharjee et al. | |
| 2010/0287143 A1 | 11/2010 | Di Carlo et al. | |
| 2011/0087854 A1 | 4/2011 | Rushworth et al. | |
| 2011/0145835 A1 | 6/2011 | Rodrigues et al. | |
| 2011/0153566 A1 | 6/2011 | Larson et al. | |
| 2011/0302143 A1* | 12/2011 | Lomet | G06F 17/30008 707/704 |
| 2012/0047126 A1 | 2/2012 | Branscome et al. | |
| 2012/0102006 A1 | 4/2012 | Larson et al. | |
| 2012/0137081 A1* | 5/2012 | Shea | G06F 12/0897 711/145 |
| 2012/0179877 A1 | 7/2012 | Shriraman et al. | |
| 2012/0191696 A1 | 7/2012 | Renkes et al. | |
| 2012/0233438 A1 | 9/2012 | Bak et al. | |
| 2012/0265728 A1 | 10/2012 | Plattner et al. | |
| 2012/0284228 A1 | 11/2012 | Ghosh et al. | |
| 2013/0054936 A1 | 2/2013 | Davis | |
| 2013/0091162 A1 | 4/2013 | Lewak | |
| 2013/0097135 A1 | 4/2013 | Goldberg | |
| 2013/0346378 A1 | 12/2013 | Tsirogiannis et al. | |
| 2014/0025651 A1 | 1/2014 | Schreter | |
| 2014/0101093 A1 | 4/2014 | Lanphear et al. | |
| 2014/0214334 A1 | 7/2014 | Plattner et al. | |
| 2014/0279930 A1 | 9/2014 | Gupta et al. | |
| 2014/0279961 A1 | 9/2014 | Schreter et al. | |
| 2015/0089125 A1 | 3/2015 | Mukherjee et al. | |
| 2015/0142819 A1 | 5/2015 | Florendo et al. | |
| 2016/0103860 A1 | 4/2016 | Bhattacharjee et al. | |
| 2016/0125022 A1 | 5/2016 | Rider et al. | |
| 2016/0147445 A1 | 5/2016 | Schreter et al. | |
| 2016/0147447 A1 | 5/2016 | Blanco et al. | |
| 2016/0147448 A1 | 5/2016 | Schreter et al. | |
| 2016/0147449 A1 | 5/2016 | Andrei et al. | |
| 2016/0147457 A1 | 5/2016 | Legler et al. | |
| 2016/0147459 A1 | 5/2016 | Wein et al. | |
| 2016/0147617 A1 | 5/2016 | Lee et al. | |
| 2016/0147618 A1 | 5/2016 | Lee et al. | |
| 2016/0147750 A1 | 5/2016 | Blanco et al. | |
| 2016/0147776 A1 | 5/2016 | Florendo et al. | |
| 2016/0147778 A1 | 5/2016 | Schreter et al. | |
| 2016/0147786 A1 | 5/2016 | Andrei et al. | |
| 2016/0147801 A1 | 5/2016 | Wein et al. | |
| 2016/0147804 A1 | 5/2016 | Wein et al. | |
| 2016/0147806 A1 | 5/2016 | Blanco et al. | |
| 2016/0147808 A1 | 5/2016 | Schreter et al. | |
| 2016/0147809 A1 | 5/2016 | Schreter et al. | |
| 2016/0147811 A1 | 5/2016 | Eluri et al. | |
| 2016/0147812 A1 | 5/2016 | Andrei et al. | |
| 2016/0147813 A1 | 5/2016 | Lee et al. | |
| 2016/0147814 A1 | 5/2016 | Goel et al. | |
| 2016/0147819 A1 | 5/2016 | Schreter et al. | |
| 2016/0147820 A1 | 5/2016 | Schreter | |
| 2016/0147821 A1 | 5/2016 | Schreter et al. | |
| 2016/0147834 A1 | 5/2016 | Lee et al. | |
| 2016/0147858 A1 | 5/2016 | Lee et al. | |
| 2016/0147859 A1 | 5/2016 | Lee et al. | |
| 2016/0147861 A1 | 5/2016 | Schreter et al. | |
| 2016/0147862 A1 | 5/2016 | Schreter et al. | |
| 2016/0147904 A1 | 5/2016 | Wein et al. | |
| 2016/0147906 A1 | 5/2016 | Schreter et al. | |

OTHER PUBLICATIONS

"HANA Persistence: Shadow Pages." Jun. 2013. *Yeditepe Üniversitesi Bilgisayar Mühendisliği Bölümü*. Web. Apr. 21, 2016. <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014. Web. Mar. 3, 2016.

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.

Jens Krueger et al. "Main Memory Databases for Enterprise Applications." Industrial Engineering and Engineering Management (IE&EM), 2011 IEEE 18th International Conference on, IEEE, Sep. 3, 2011 (Sep. 3, 2011), pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

* cited by examiner

DELEGATION OF DATABASE POST-COMMIT PROCESSING

TECHNICAL FIELD

The subject matter described herein relates to a database system that provides for an atomic commit based on setting a commit timestamp in a transaction control block and post-commit updating/processing of a multi-version concurrency cell.

BACKGROUND

Some databases use timestamp-based multi-version concurrency control (MVCC) to minimize conflicts with regard to simultaneous transactions. With this arrangement, records in the database are (logically) tagged with creation and deletion timestamps that correspond to transactions that created and deleted the record. If a record has not yet been deleted, the deletion timestamp is unset (which can be represented by some special value, such as maximum representable integer value).

A consistent view (or snapshot) on the database is needed to ensure consistent execution of a SQL statement or of a whole transaction. The consistent view is created by taking the current value of the commit timestamp generator. This timestamp is then used against create and delete timestamps (CTS, DTS) to decide visibility of the record.

SUMMARY

In one aspect, a plurality of transactions are handled in a database. Each transaction comprises a plurality of operations on at least one record in the database with at least two of the transactions being handled concurrently. Thereafter, a temporary timestamp is assigned to each record that is based, at least in part, on the corresponding transaction. A first transaction among the plurality of transactions is subsequently committed. Afterwards, re-stamping of at least one commit timestamp modified by the first transaction is delegated.

Each transaction can have a corresponding transaction control block within a transaction control block array. Each transaction control block can include an identifier for the transaction, a state of the transaction, and at least one timestamp. The state of the transaction can be, for example, free, active, aborted, committing, or committed. It can be determined, using a visibility function, which of the plurality of records in the database are visible to the first transaction. The first transaction can then be allowed to access the records determined to be visible. The visibility function can use both the state of the transaction and the at least one timestamp from the transaction control block for the first transaction in determining which records are visible.

The delegating can include delegating the re-stamping of the temporary timestamp for the first transaction to a background process. The delegating can also or alternatively include passing an undo file identifying a plurality of commit timestamps to be processed to a garbage collector, re-stamping transaction control block states for a plurality of transaction control blocks corresponding to the commit timestamps, and setting the re-stamped transaction control blocks as free.

Aborting a second transaction can be initiated. Thereafter, the state in the transaction control block for the second transaction can be set to aborted. Any changes to timestamps in the transaction control block are undone for the second transaction. Next, the state in the transaction control block for the second transaction can be set to free.

Committing the first transaction can include setting the state in the transaction control block for the first transaction to committing, first issuing a write memory barrier, setting the commit timestamp in the transaction control block for the first transaction so that it is equal to an atomic increment of a value from a commit timestamp generator, second issuing a write memory barrier, and setting the state in the transaction control block for the first transaction to committed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, by delegating post-commit processing to an asynchronous job and changing the visibility function (as is done with the current subject matter), the commit can be processed with O(1) complexity. This arrangement greatly reduces latency of commit processing. Although the current subject matter requires a visibility function with higher complexity, this complexity only materializes for records with not-yet-postcommitted timestamps, which should be comparatively small number, because post-commit processing is triggered immediately after transaction finishes.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches; especially with regard to processing of concurrent transactions. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
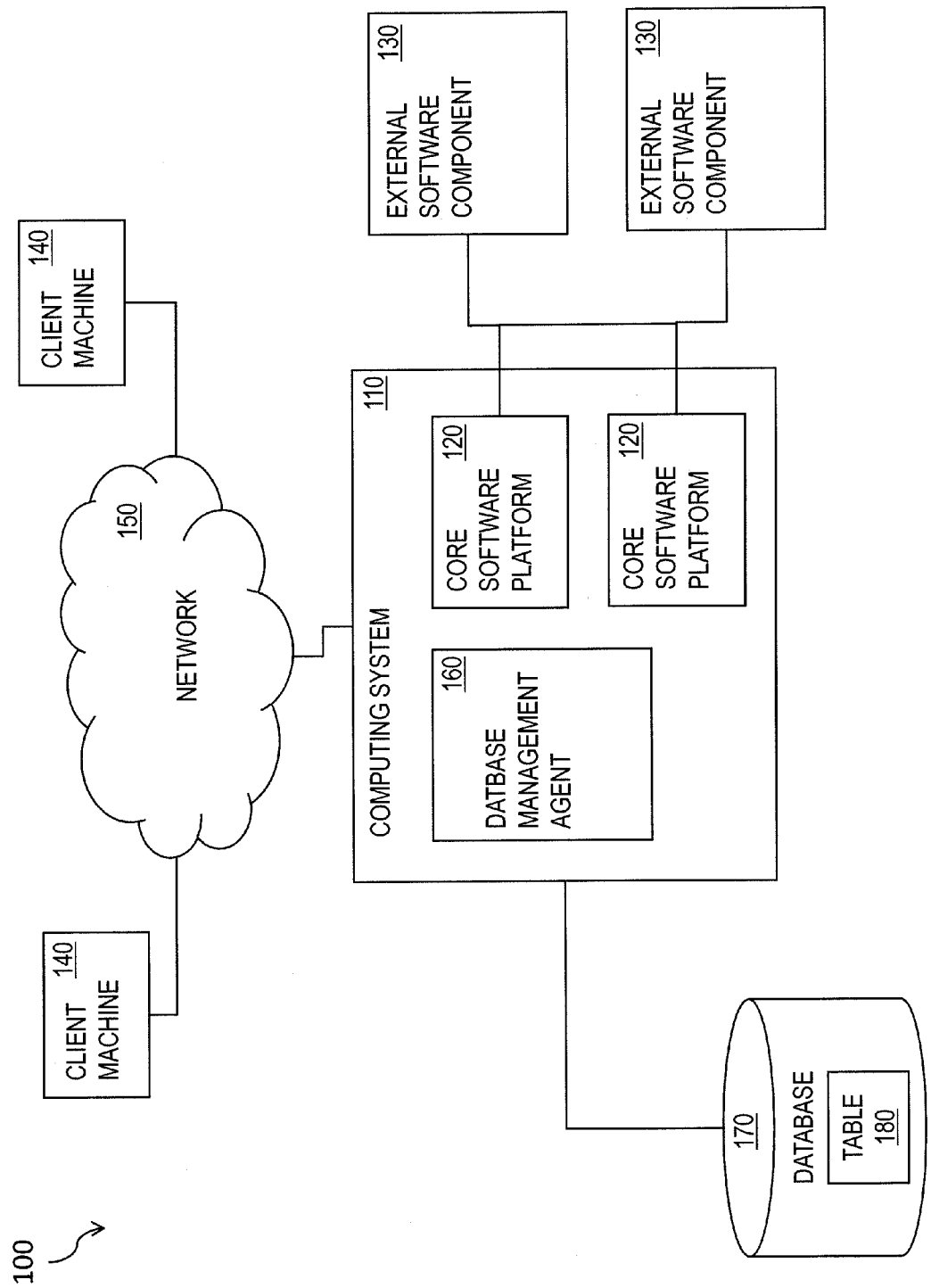
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 (sometimes referred to just as a database) that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
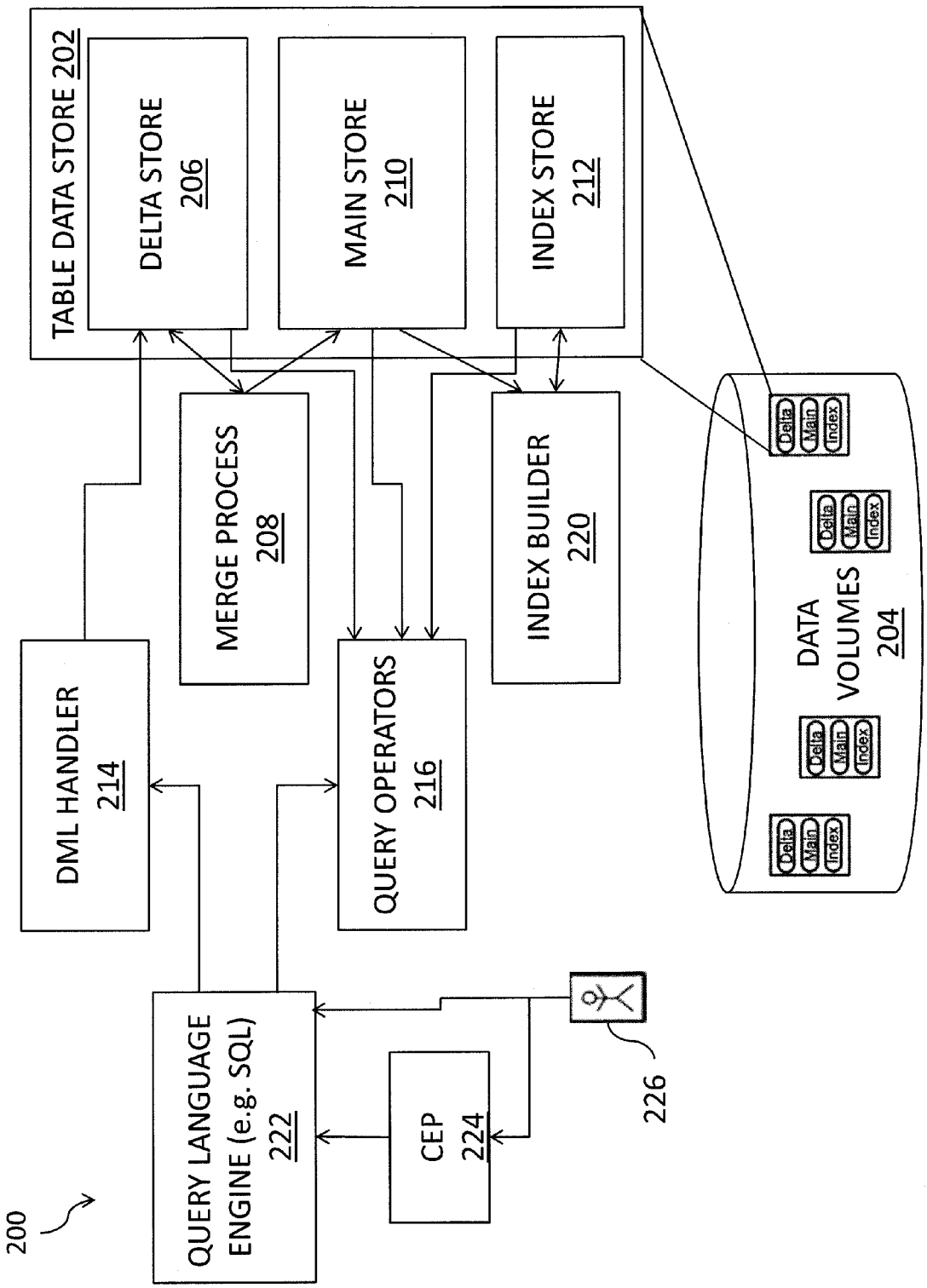
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
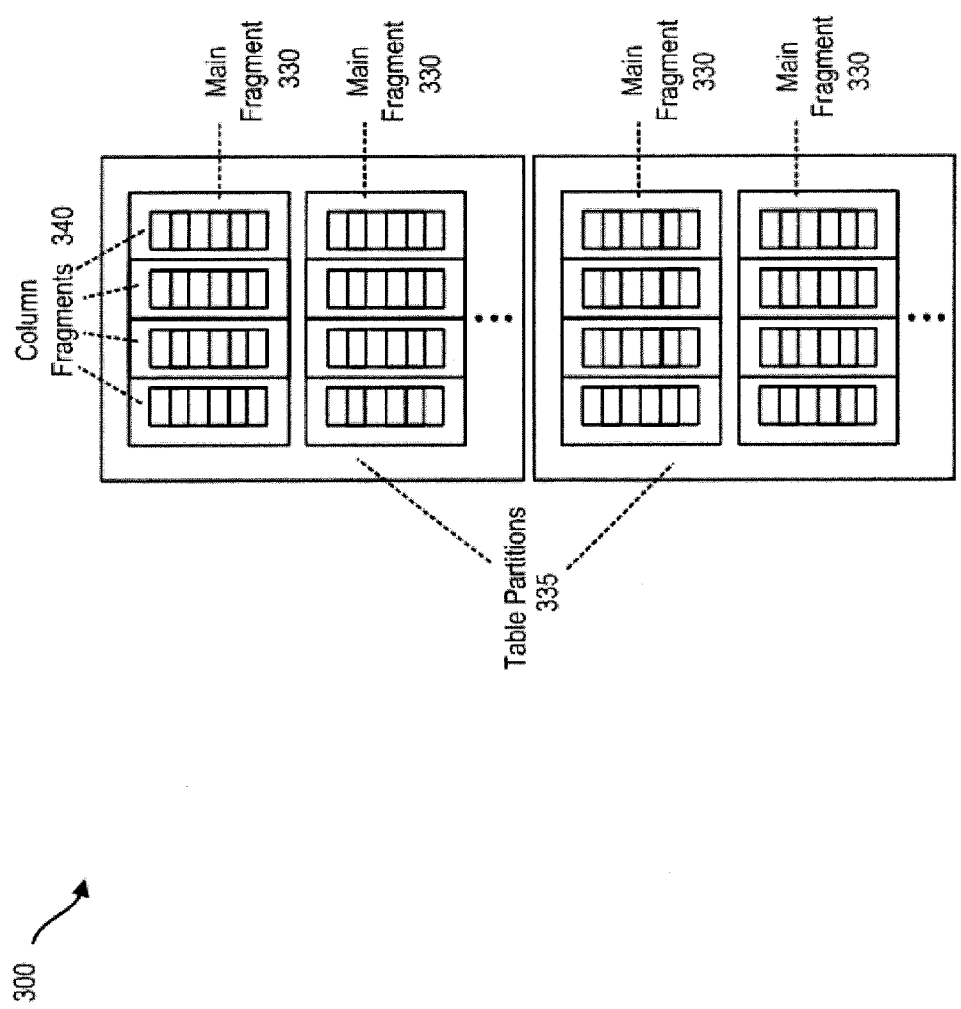
FIG. 3 is a schematic representation of fragments stored in a main store.

To achieve a best possible compression and also to support very large data tables, a main part of the table can be divided into one or more fragments. FIG. 3 shows a schematic representation of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
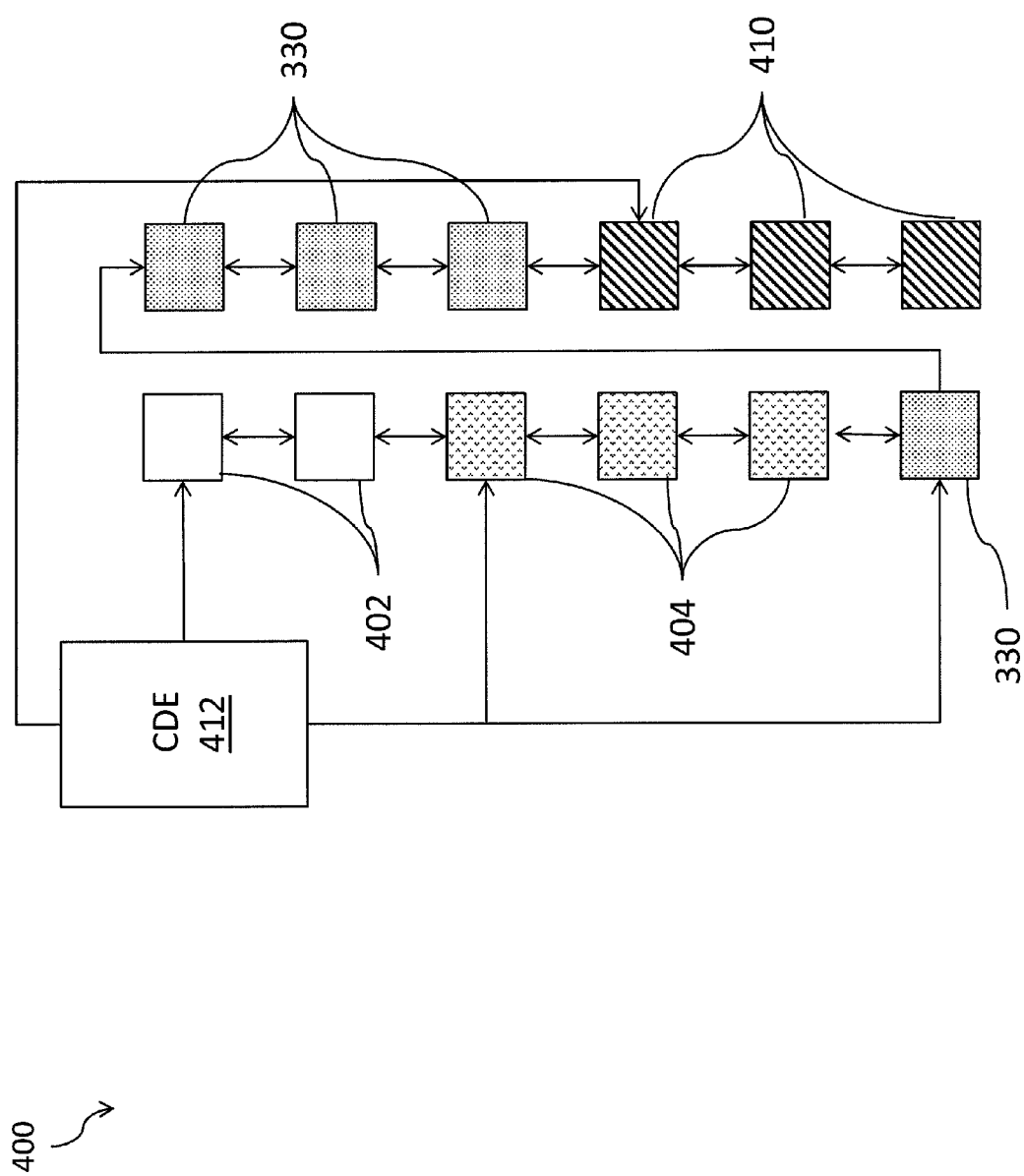
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
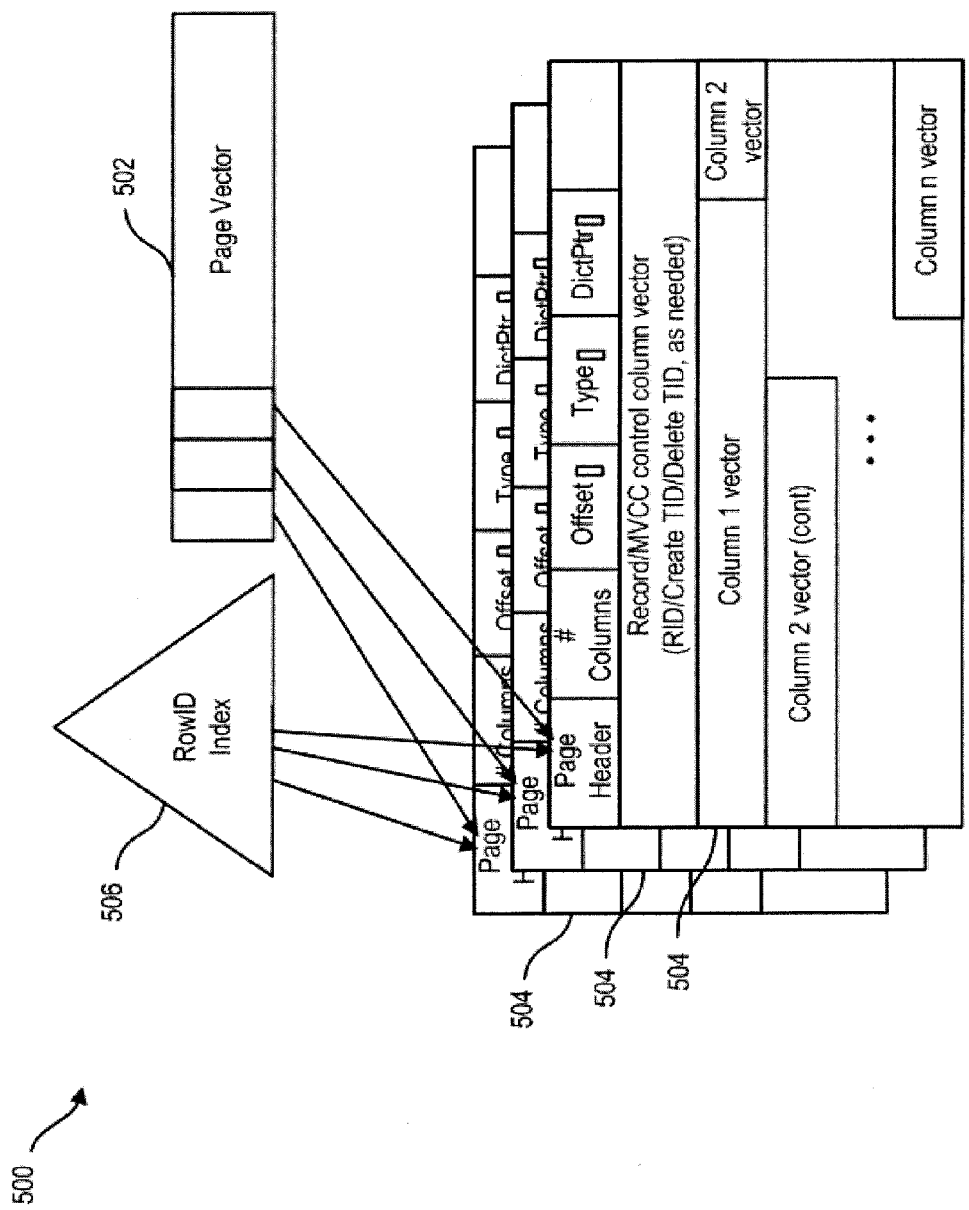
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
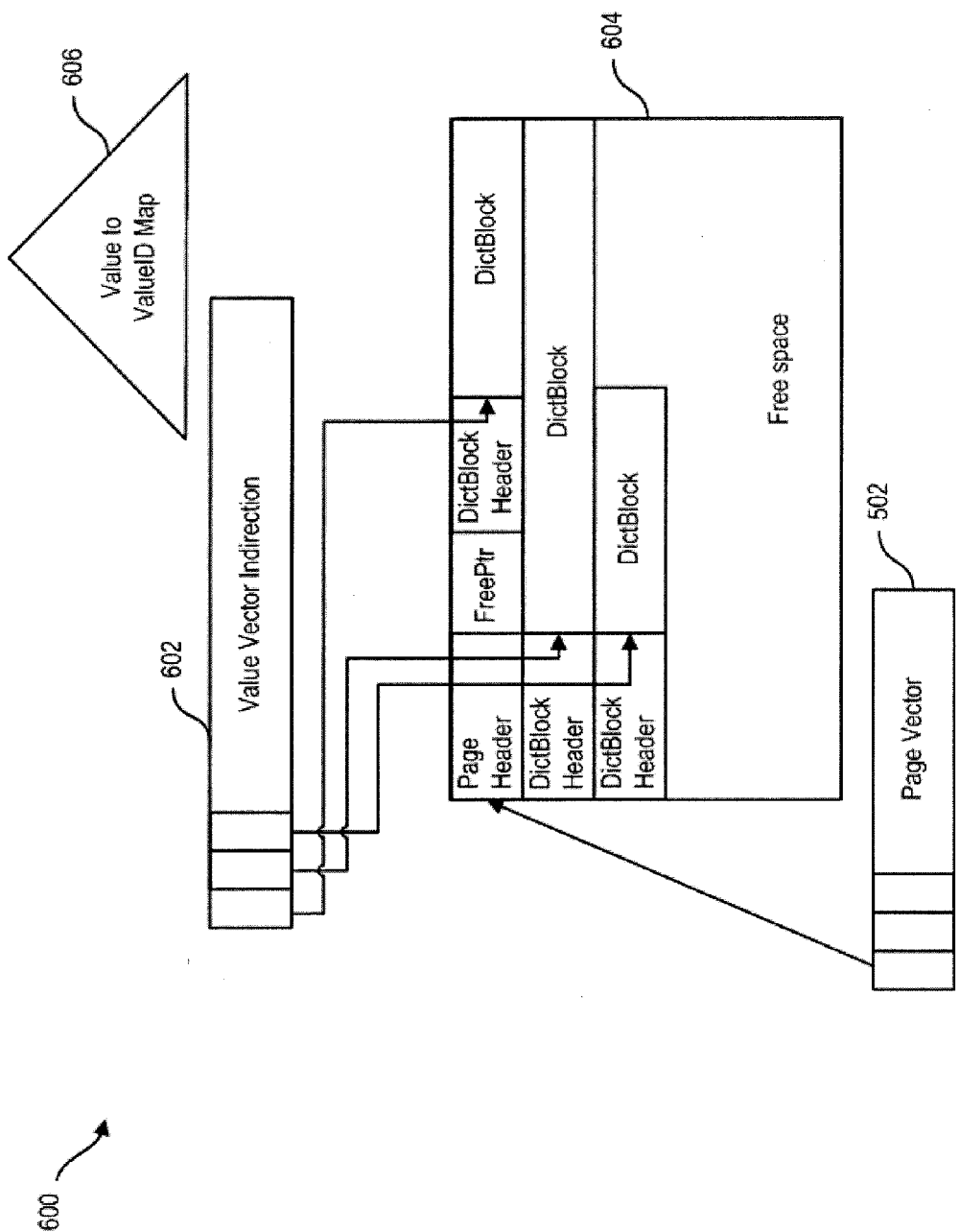
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 602 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
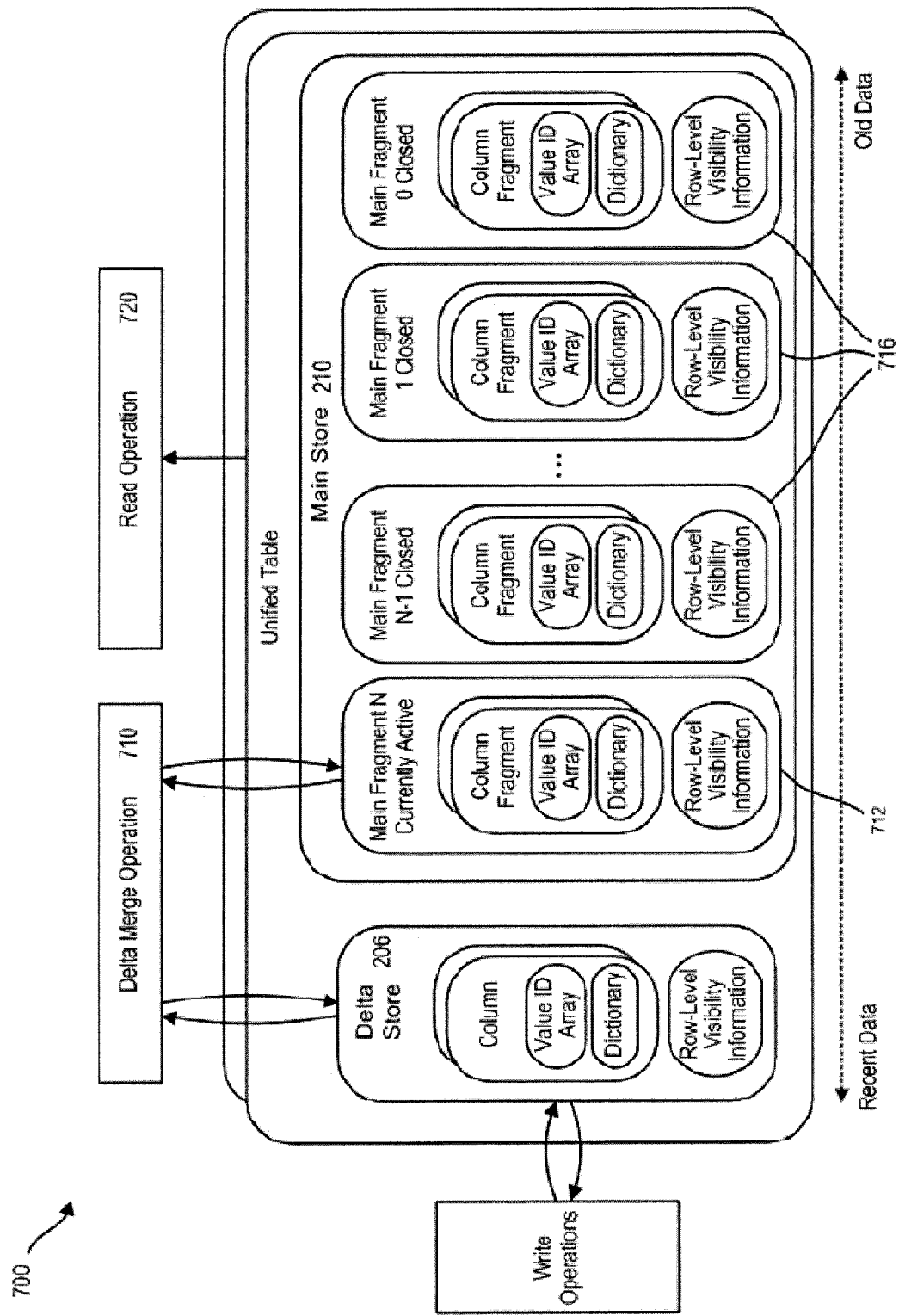
FIG. 7 is a functional block diagram illustrating performing a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

As noted above, the current subject matter, in order to reduce commit latency, addresses two main issues. First, the current subject matter allows for visibility lookups to succeed properly for temporary timestamps of committed transactions, which have not been re-stamped yet. Second, the current subject matter provides for delegation of actual re-stamping of timestamps modified in a transaction to a later time.

The database 170 can write timestamps to each record to allow for determinations to be made whether such records are available as part of a consistent view. These timestamps can be represented as integer values (e.g., 64 bits, etc.). Each in-flight transaction can be represented by a transaction index (e.g., 32 bit length, etc.) which can, for example, be an index number of a transaction control block in an array of transaction control blocks (referred to herein as a transaction control block index or simply TCB index). In some cases, the array of transaction control blocks can be pre-allocated (as opposed to being dynamically allocated).

In order to allow an in-flight transaction to read its own writes (i.e., records that the transaction writes to, etc.), the consistent view can be based not only on a timestamp but also on the TCB index of the transaction. With reference to Table 1 below, each time stamp can be encoded with at least one bit being a flag indicating whether it is a final time stamp or it is a temporary timestamp. The final timestamp can also include a portion encapsulating the commit timestamp. The temporary time stamp can also include a portion encapsulating the corresponding TCB index value.

TABLE 1

| Final timestamp | 63 Flag = 0 | 62 . . . 0 Commit timestamp | |
|---|---|---|---|
| Temporary timestamp | 63 Flag = 1 | 62 . . . 32 (reserved) | 31 . . . 0 TCB index |

Figure 8:
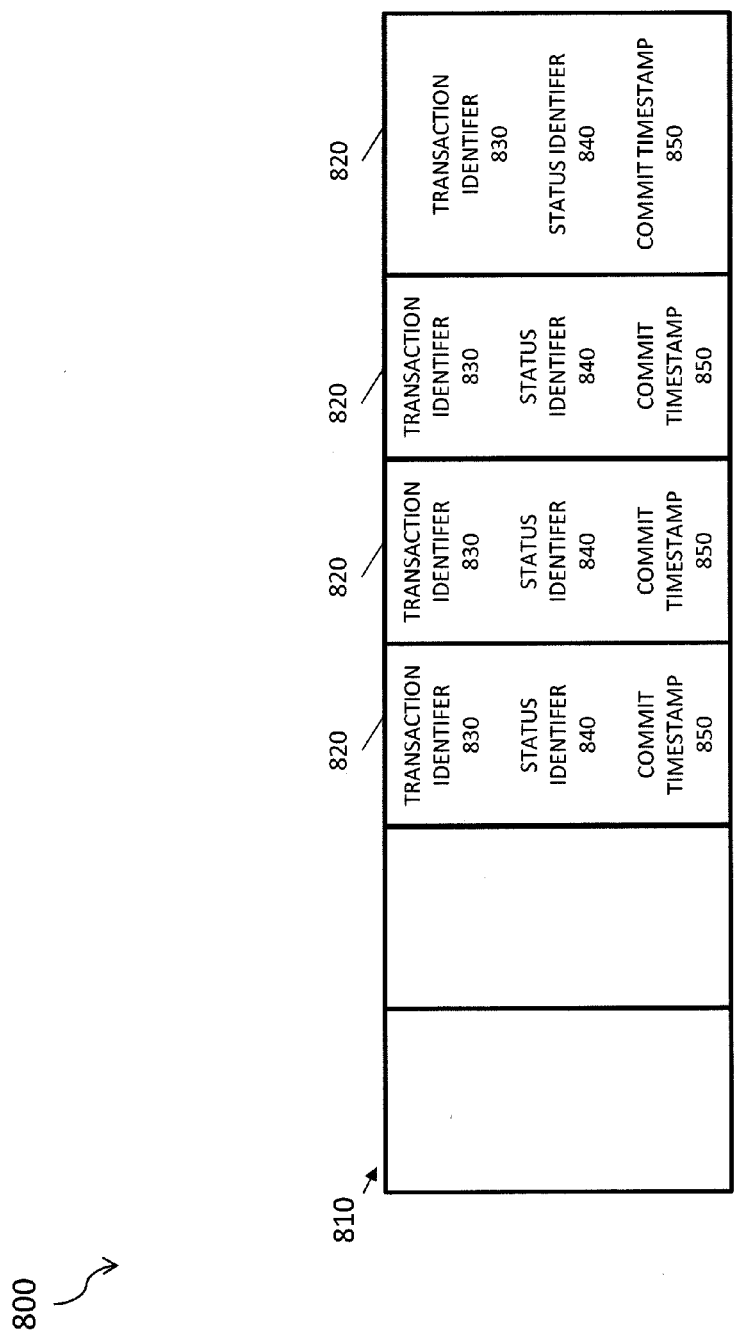
FIG. 8 is a diagram illustrating a transaction control block array with a plurality of transaction control blocks.

With reference to diagram 800 of FIG. 8, a transaction control block array 810 can include a plurality of transaction control blocks (TCBs) 820. Each TCB 820 can include an identifier 830 for the transaction, a state 840 that specifies a state of the corresponding transaction and a commit timestamp 850 (which can be assigned during commit processing). The state 840 can be one of many bit combinations that can characterize a state of the corresponding transaction. The states can include, for example, the following:

Free—the transaction control block is not used;
Active—the transaction is running;
Aborted—the transaction was aborted (optional state);
Committing—the transaction started commit processing; and/or
Committed—the transaction has already committed.

Upon starting, a transaction allocates a TCB 820 in the transaction control block array 830 if there is no previous TCB 820 associated with the transaction. This allocation can be accomplished by changing the state 840 of a TCB 820 from Free to Active.

Figure 9:
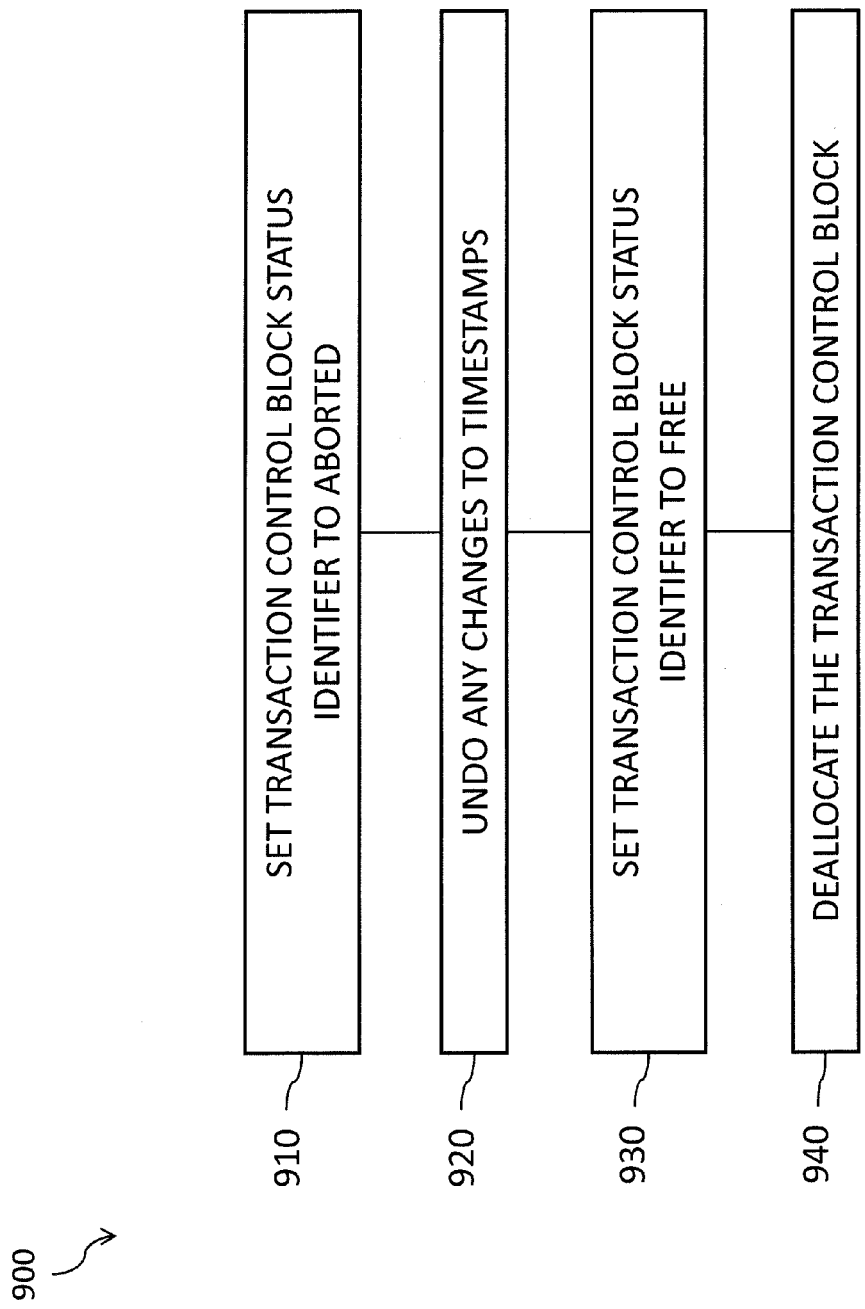
FIG. 9 is a process flow diagram illustrating handling of a transaction abort.
Figure 10:
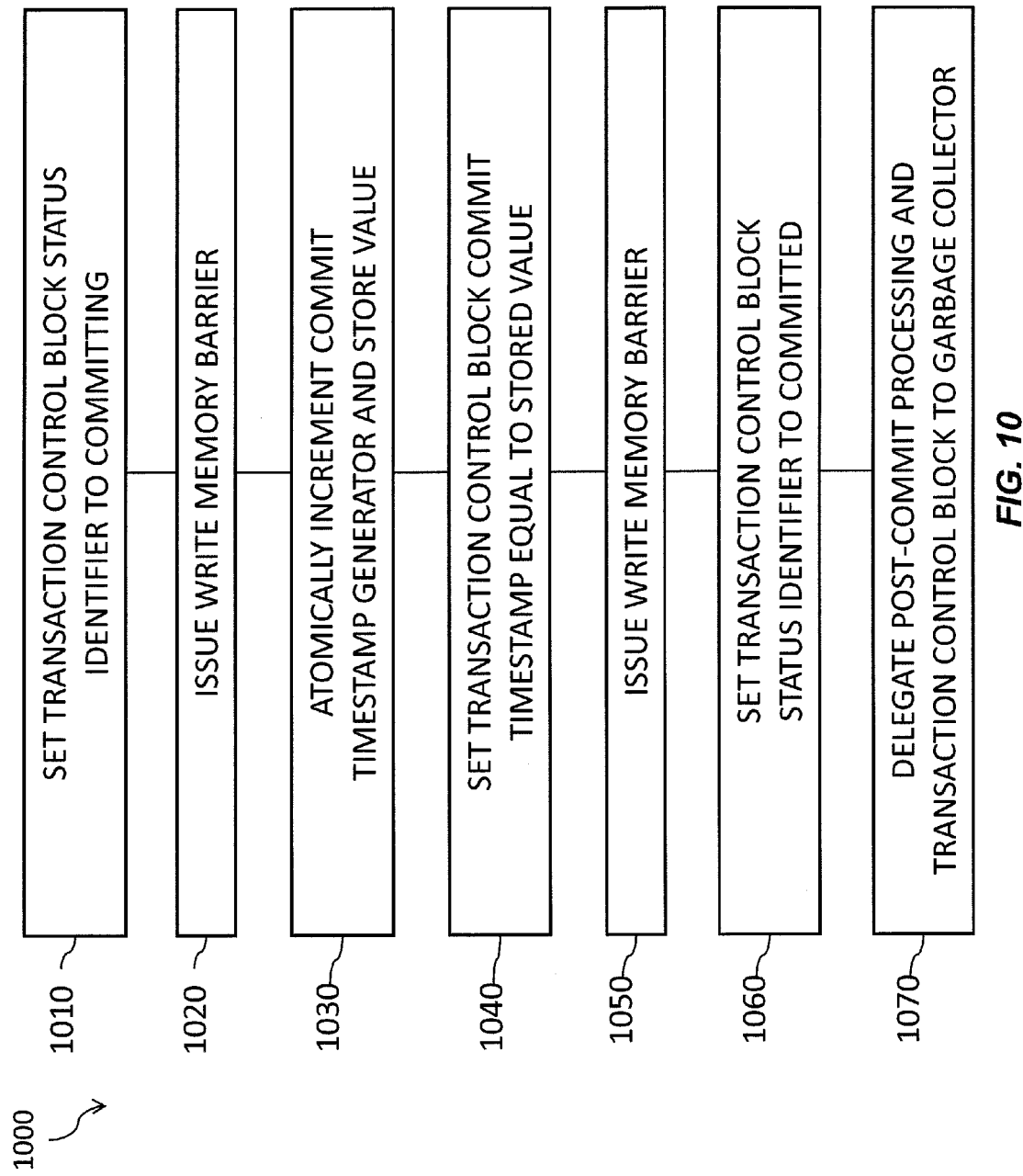
FIG. 10 is a process flow diagram illustrating handling of a transaction commit.

With reference to diagram 900 of FIG. 9, a transaction abort can be processed by first setting the state 840 of the corresponding TCB 820, at 910, from Active to Aborted. Thereafter, at 920, any changes made to timestamps by such transaction can be undone. Once these changes are undone, at 930 the state 840 for the same TCB 820 can be changed from Aborted to Free (allowing the TCB 820 to be used by a subsequent transaction) and, at 940, the TCB 820 can be put to a freelist or otherwise de-allocated. With subsequent transactions, the freelist is first searched in order to attempt to obtain a TCB index.

A transaction commit can be processed by first setting the state 840 of the corresponding TCB 820, at 1010, from Active to Committing. Thereafter, at 1020, a write memory barrier (on systems which do not follow a total store order (TSO) memory model) can be issued. Memory barriers, in this regard, can prevent race conditions on non-TSO (time sharing option) systems by ensuring write ordering of operations before and after the barrier. Next, at 1030, a commit timestamp generator (CommitTSGenerator) can be atomically incremented (i.e., incremented by one value) and, at 1040, the new value can be stored as the commit timestamp 850 (CommitTS) in the TCB 820. A write memory barrier is then, at 1050, issued. The state 840 of the TCB 820 is then changed, at 1060, from Committing to Committed. Further, at 1070, any post-commit processing can be delegated and the TCB can be sent to a garbage collector. It will be appreciated that with the above, commit processing is executed in a compact manner that is not dependent on the size of the transaction (thereby increasing speed and efficiency).

The records can, in some cases, form part of a transaction log which can be used to facilitate recovery. One example of a log recovery system can be found in U.S. Pat. No. 8,768,891, the contents of which is hereby fully incorporated by reference. Further, notifications can be provided to the client 140 to identify which records are visible for various transactions.

As postcommit processing is not done before the CommitTSGenerator is incremented, visibility checking in consistent views (CV) created between (i) incrementing of the CommitTSGenerator and (ii) before asynchronous post-commit processing finishes can encounter either a final timestamp or temporary timestamp of committed transaction. To handle this scenario, visibility function visible(CV, TS) can be as follows:

if TS≤CV·TS, return true (normal timestamp visibility check)
if TS·Flag=0, return false (normal timestamp, invisible)
if TS·TCBIndex=CV·TCBIndex, return true (read-my-writes, own TCB)
if TCB[TS·TCBIndex]·state=Committing, retry (hit very short critical phase in commit processing above between steps 1010 and 1060)
if
  TCB[TS·TCBIndex]·state=Committed^TCB
  [TS·TCBIndex]·CommitTS≤CV·TS
  return true (committed, but not yet post-committed timestamp visible in the consistent view)
else return false (all other cases)

All operations above can be executed on an atomically-read copy of the timestamp to prevent race conditions arising from changing the timestamp in parallel by garbage collector executing postcommit operation.

Post-commit processing can be delegated by delegating the list of timestamps collected during transaction processing alongside of its TCB to a background process, which will process the timestamps in parallel to other work. This background process can be, for example, solved by a dedicated thread or a thread pool.

However, transaction processing in some databases can keep track of operations performed as part of the transaction in an UNDO file. This UNDO file can be used for two primary purposes: (1) Roll back of a transaction in case of transaction abort (executed inline); and (2) Clean-up of deleted records after no potential old reader exists (executed by the garbage collector).

Figure 11:
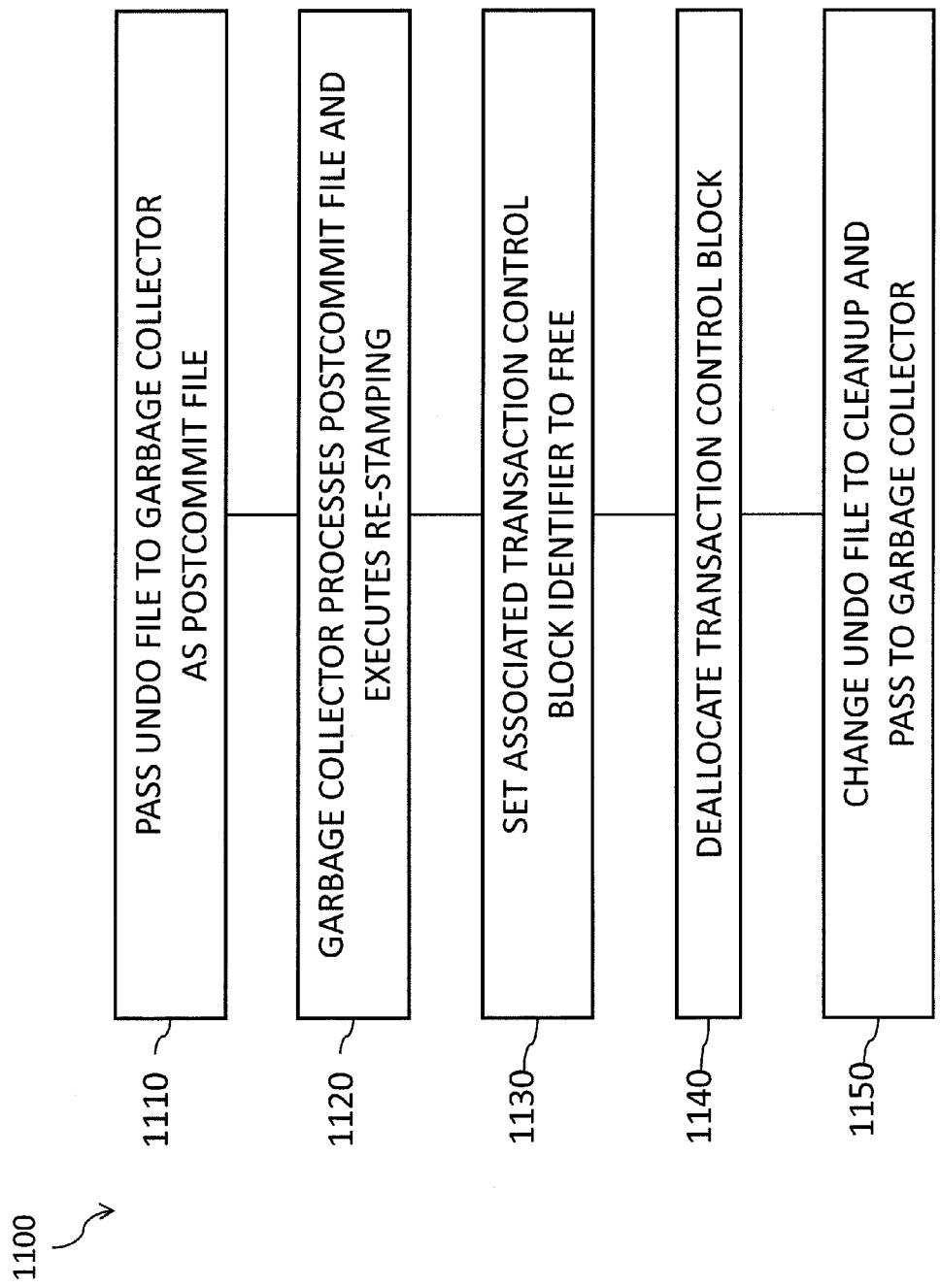
FIG. 11 is a process flow diagram illustrating post-commit processing using an undo file.

The UNDO file can include sufficient information to identify all commit timestamps which need to be processed. As such, rather than generating a separate list, the UNDO file can be used to provide a list of timestamps modified by the transaction. Therefore, cleanup processing can proceed as follows and as illustrated in diagram 1100 of FIG. 11. Initially, at 1110, the UNDO file can be passed to a garbage collector (i.e., a module/code that maintains history UNDO files for each table in database 170 and executed postcommit/cleanup on them) as a POSTCOMMIT file first at the time of commit processing. Thereafter, at 1120, the garbage collector can process the POSTCOMMIT file and execute re-stamping of each affected record. After the re-stamping of each record is completed, at 1130, the associated state 840 for the corresponding TCB 810 is set to Free. In addition, at 1140, the TCB 810 is deallocated (so that it can be reused by later transactions). Lastly, at 1150, the UNDO file type can be changed to cleanup and passed to again to the garbage collector. The garbage collector can then schedule cleanup of the UNDO file when there is no outdated consistent view that could potentially read any of the older versions).

Figure 12:
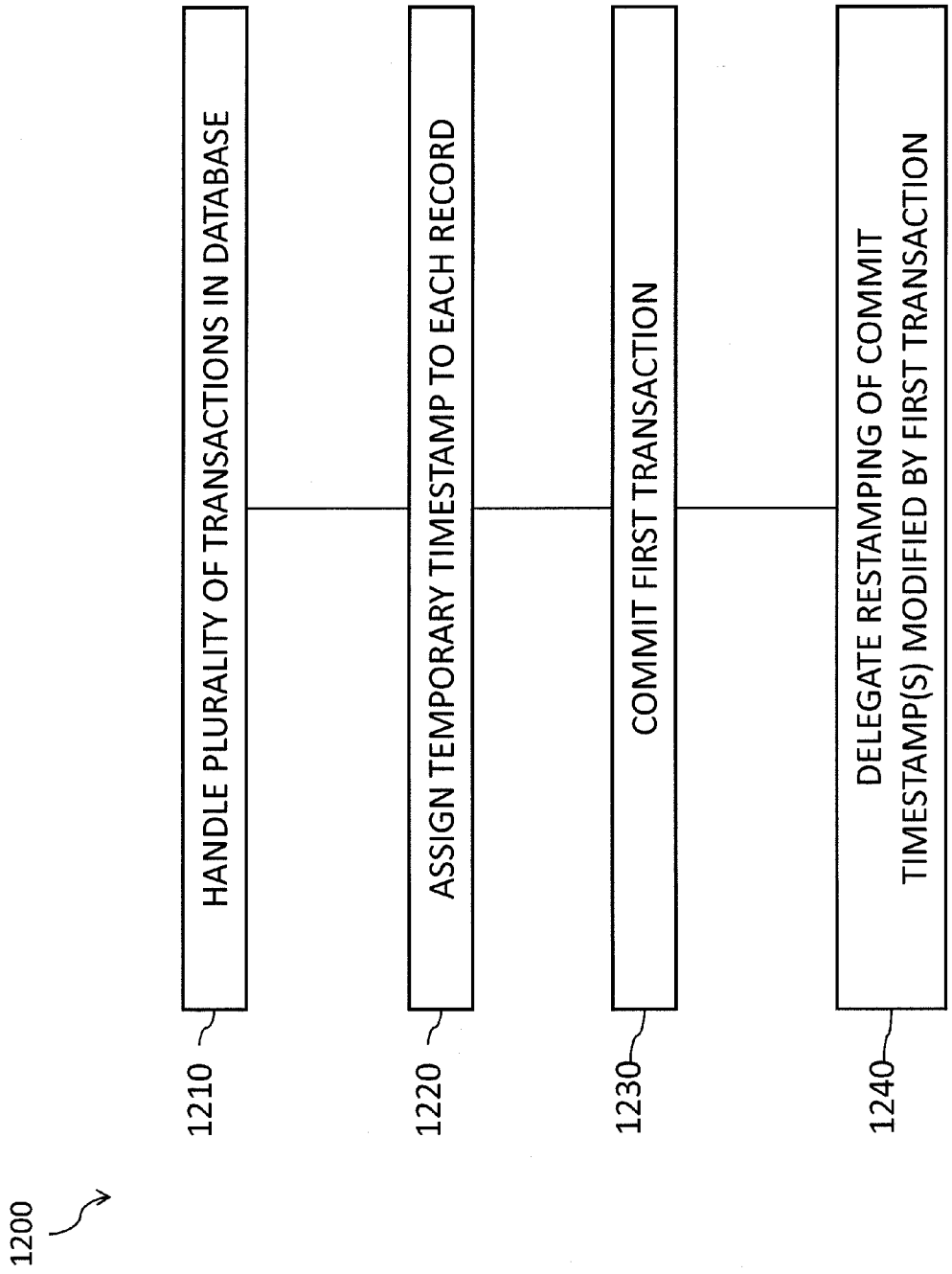
FIG. 12 is a process flow diagram illustrating delegation of post-commit processing.

FIG. 12 is a diagram 1200 in which, at 1210, a plurality of transactions are handled in a database. Each transaction comprises a plurality of operations on at least one record in the database and at least two of the transactions can be handled concurrently. Thereafter, at 1220, a temporary timestamp is assigned to each record with temporary timestamp being based, at least in part, on the corresponding transaction (e.g., transaction number, etc.). Next, at 1230, a first transaction among the plurality of transactions is committed. Afterwards, at 1240, re-stamping at least one commit timestamp modified by the first transaction can be delegated.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    handling a plurality of transactions in a database, each transaction comprising a plurality of operations on at least one record in the database, at least two of the transactions of the plurality of transactions being handled concurrently by separate handling processes;
    assigning a temporary timestamp to each record, the temporary timestamp being based, at least in part, on the corresponding transaction;
    committing a first transaction among the plurality of transactions; and
    delegating, after committing of the first transaction, re-stamping of at least one temporary timestamp for a first record of the at least one record in the database, the first record being modified by the first transaction, the delegating comprising causing a different process than the handling process for the first transaction to perform the re-stamping, the delegating further comprising passing an undo file identifying a plurality of commit timestamps to be processed to a history manager, re-stamping transaction control block states for a plurality of transaction control blocks corresponding to the commit timestamps, and setting the re-stamped transaction control blocks as free.

2. The method of claim 1, wherein each transaction has a corresponding transaction control block within a transaction control block array.

3. The method of claim 2, wherein each transaction control block comprises an identifier for the transaction, a state of the transaction, and at least one timestamp.

4. The method of claim 3, wherein the state of the transaction is selected from a group consisting of: free, active, aborted, committing, and committed.

5. The method of claim 4 further comprising:
    determining, using a visibility function, which of the plurality of records in the database are visible to the first transaction; and
    allowing the first transaction to access the records determined to be visible.

6. The method of claim 5, wherein the visibility function uses both the state of the transaction and the at least one timestamp from the transaction control block for the first transaction in determining which records are visible.

7. The method of claim 1, wherein the different process comprises a background process.

8. The method of claim 4 further comprising:
    initiating aborting a second transaction;
    setting the state in the transaction control block for the second transaction to aborted;
    undoing any changes to timestamps in the transaction control block for the second transaction;
    setting the state in the transaction control block for the second transaction to free.

9. The method of claim 4, wherein committing the first transaction comprises:
    setting the state in the transaction control block for the first transaction to committing;
    first issuing a write memory barrier;
    setting the commit timestamp in the transaction control block for the first transaction so that it is equal to an atomic increment of a value from a commit timestamp generator;
    second issuing a write memory barrier; and
    setting the state in the transaction control block for the first transaction to committed.

10. A non-transitory computer program product storing instructions which, when executed by at least one hardware data processor forming part of at least one computing device, result in operations comprising:
    handling a plurality of transactions in a database, each transaction comprising a plurality of operations on at least one record in the database, at least two of the transactions of the plurality of transactions being handled concurrently by separate handling processes;
    assigning a temporary timestamp to each record, the temporary timestamp being based, at least in part, on the corresponding transaction;
    committing a first transaction among the plurality of transactions; and
    delegating, after committing of the first transaction, re-stamping of at least one temporary timestamp for a first record of the at least one record in the database, the first record being modified by the first transaction, the delegating comprising causing a different process than the handling process for the first transaction to perform the re-stamping, the delegating further comprising passing an undo file identifying a plurality of commit timestamps to be processed to a history manager, re-stamping transaction control block states for a plurality of transaction control blocks corresponding to the commit timestamps, and setting the re-stamped transaction control blocks as free.

11. The computer program product of claim 10, wherein each transaction has a corresponding transaction control block within a transaction control block array.

12. The computer program product of claim 11, wherein each transaction control block comprises an identifier for the transaction, a state of the transaction, and at least one timestamp.

13. The computer program product of claim 12, wherein the state of the transaction is selected from a group consisting of: free, active, aborted, committing, and committed.

14. The computer program product of claim 13, wherein the operations further comprise:
    determining, using a visibility function, which of the plurality of records in the database are visible to the first transaction; and
    allowing the first transaction to access the records determined to be visible.

15. The computer program product of claim 14, wherein the visibility function uses both the state of the transaction and the at least one timestamp from the transaction control block for the first transaction in determining which records are visible.

16. The computer program product of claim 10, wherein the different process comprises a background process.

17. The computer program product of claim 13, wherein the operations further comprise:

initiating aborting a second transaction;
setting the state in the transaction control block for the second transaction to aborted;
undoing any changes to timestamps in the transaction control block for the second transaction;
setting the state in the transaction control block for the second transaction to free.

18. A system comprising:
at least one hardware data processor; and
memory storing instructions which, when executed by the at least one hardware data processor, result in operations comprising:
   handling a plurality of transactions in a database, each transaction comprising a plurality of operations on at least one record in the database, at least two of the transactions of the plurality of transactions being handled concurrently by separate handling processes;
   assigning a temporary timestamp to each record, the temporary timestamp being based, at least in part, on the corresponding transaction;
   committing a first transaction among the plurality of transactions; and
   delegating, after committing of the first transaction, re-stamping of at least one temporary timestamp for a first record of the at least one record in the database, the first record being modified by the first transaction, the delegating comprising causing a different process than the handling process for the first transaction to perform the re-stamping, the delegating further comprising passing an undo file identifying a plurality of commit timestamps to be processed to a history manager, re-stamping transaction control block states for a plurality of transaction control blocks corresponding to the commit timestamps, and setting the re-stamped transaction control blocks as free.

* * * * *